May 23, 1939.   H C CHRIST   2,159,254
LICENSE PLATE LOCK
Filed Sept. 12, 1938

INVENTOR
H. C. Christ
BY
ATTORNEY

Patented May 23, 1939

2,159,254

UNITED STATES PATENT OFFICE 2,159,254

LICENSE PLATE LOCK

Herman C. Christ, Walkermine, Calif.

Application September 12, 1938, Serial No. 229,486

9 Claims. (Cl. 40—125)

This invention relates generally to motor vehicle equipment, and in particular is directed to—and it is my principal object to provide—a license plate holder for motor vehicles which is arranged to hold a license plate thereon in theft-proof connection; the device being so arranged that a license plate when mounted on the holder cannot be removed without destruction or substantial mutilation of the plate whereby to prevent persons such as automobile thieves from removing or substituting license plates. At the same time, the holding device itself remains undamaged and may be used from year to year.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
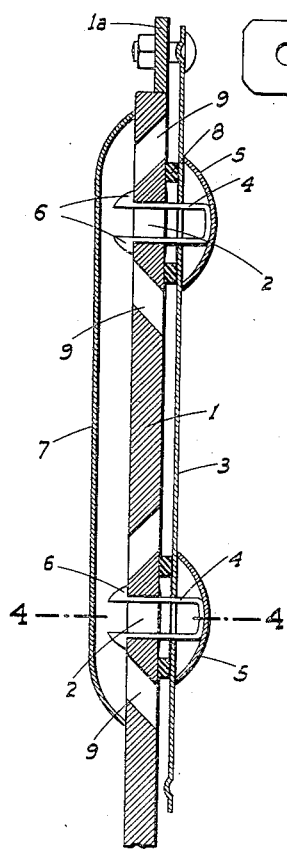
Figure 1 is a sectional elevation of the device as in use and with a license plate mounted thereon.
Figure 2:
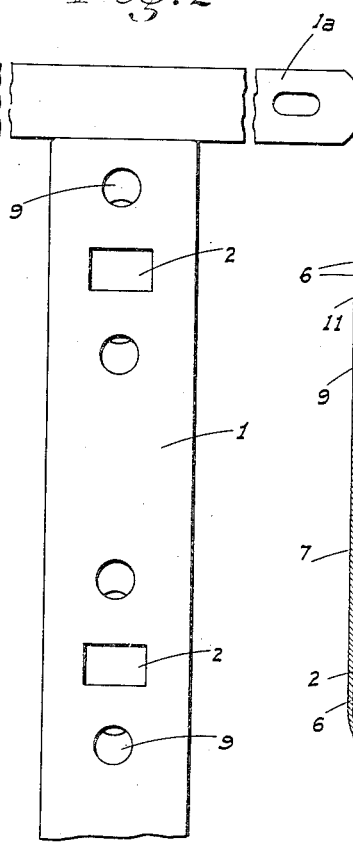
Figure 2 is a front view of the supporting bar.
Figure 3:
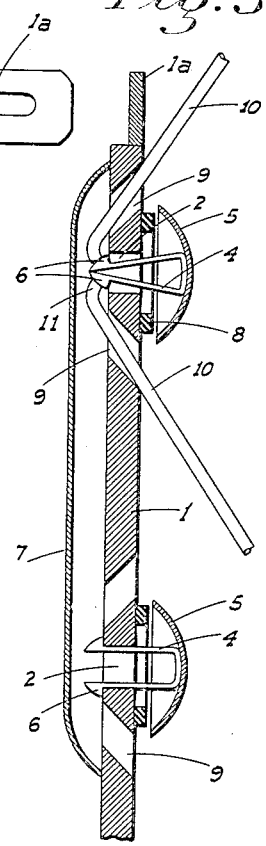
Figure 3 is a sectional elevation illustrating the manner in which the spring clips are released.

Referring now more particularly to the characters of reference on the drawing, and particularly at present to the preferred form of the invention as shown in Figs. 1-4 inclusive, the numeral 1 indicates a flat supporting bar which may be non-removably fixed in position on a motor vehicle in any desired manner. This bar is formed with longitudinally spaced, rectangular openings 2 therethrough; said openings being elongated in a direction transversely of the bar.

A license plate 3, having holes which register with openings 2, is secured in theft-proof relation on the bar 1 as follows:

U-shaped spring clips 4 whose legs tend to spread, and each including an enlarged, circular and concave head 5 into which the bight of the clip is secured, are inserted through the holes in the plate and the registering openings 2 in the bar; the legs of said clips having hooks 6 projecting laterally outward from their free ends and facing in the direction of the heads 5. These hooks, under the tension of the legs of the clips, engage the back surface of bar 1 adjacent openings 2 when the legs are inserted therethrough thus preventing retraction of the clips.

A cap or housing 7 is secured in non-removable connection with the back of bar 1 and encloses the same for substantially its full length preventing access to the inner end or hook portions of the clips. If desired, relatively thin washers 8 of resilient material such as rubber may surround the clips between the bar and license plate so as to prevent rattling of the latter.

With a license plate mounted as above described, the plate is secured against unauthorized removal. The plate cannot be removed from the holder unless substantially destroyed or mutilated. When a new plate is to be installed, the old plate is cut or mutilated sufficiently to provide access to the bar adjacent both sides of each opening 2 and to passages 9 which extend through the bar adjacent each elongated side of the openings 2 beyond the circumferential plane of the heads 5; these passages sloping toward and terminating adjacent the inner ends of openings 2 and within the cap 7. Small screwdrivers or specially formed releasing tools 10, including a laterally curved tip 11, are inserted through channels 9 and engaged with hooks 6 which are forced together against the tension of the legs of the clips. The clips may then be withdrawn without difficulty and reused to mount the new plate.

Figure 4:
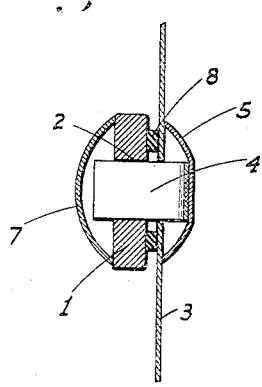
Figure 4 is a cross section taken on line 4—4 of Fig. 1.

In order to assure that the hooks will always be in proper position to be engaged by tools 10, the openings 2 are elongated as previously described and the legs of the clips are of a width equal to the length of said openings as shown in Fig. 4 whereby the clips can only be inserted in proper position.

Figure 5:
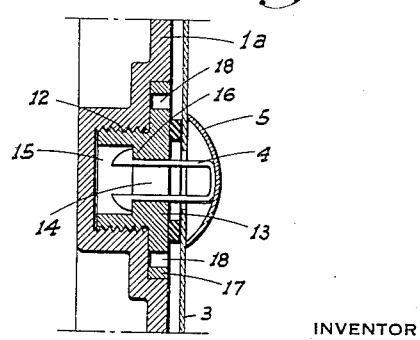
Figure 5 is a fragmentary, sectional elevation of a modified type of the invention.

In the modification of the invention shown in Fig. 5, the bar 1a is formed with integral sockets 12 each of which is threaded to receive a screw plug 13. The plug has a bore 14 therethrough and adjacent its inner end this bore is enlarged as at 15 to form an annular shoulder 16. The plug 13 includes an enlarged flange 17 recessed in the face of the bar; the flange being formed with diametrally spaced holes 18 which are positioned from the axis of the plug a greater distance than the diameter of the head 5 of a spring clip 4.

With this form of the invention the legs of the clip extend through bore 14 and hooks 6 engage against annular shoulder 16 to prevent withdrawal of the clip. When a license plate has been mutilated and removed, a spanner wrench is engaged in holes 18 and plug 13 unscrewed.

Thereafter the plug and clip can be readily separated.

If the bar 1 is disposed vertically as shown, a cross member 1a is secured rigid with said bar along the top, and extends substantially the full length of the license plate.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A holder for a license plate having an opening therethrough, said holder comprising a supporting member having an opening therethrough and adapted to register at one end with the opening in the license plate, means enclosing the other end of the member opening, a shoulder surrounding the enclosed end of said opening, a spring clip adapted for insertion through said registering openings, said clip including a spring leg, a hook on the inserted end of the leg adapted to engage the shoulder, and a head on the other end of the leg; and means providing for the release of said hook from the shoulder available only upon removal of the portion of the license plate adjacent said registering openings.

2. A device as in claim 1 in which the head is of substantial diameter and concave; the leg being secured on the concave face of said head.

3. A device as in claim 1 including a resilient washer adapted to surround the leg of the spring clip between the license plate and said member.

4. A holder for a license plate having an opening therethrough, said holder comprising a supporting bar having an opening therethrough and adapted to register at one end with the opening in the plate, means enclosing the other end of the bar opening, a shoulder surrounding the enclosed end of the bar opening, a spring clip adapted for insertion through the bar opening, said clip comprising a U-shaped element having spring legs, hooks formed on the inserted ends of said legs and adapted to engage the shoulder, and a head fixed on the bight of said element; and means providing for the release of said hooks from the shoulder available only upon removal of the portion of the plate adjacent said registering openings.

5. A device as in claim 4 in which said last named means comprises passages formed in the bar adjacent the bar opening and providing access to the hooks when engaged with the shoulder.

6. A device as in claim 4 in which the first named means comprises a cap non-removably fixed on the bar.

7. A device as in claim 4 in which the bar opening is elongated and in which the legs of the clip are of a width substantially equal to the length of the opening; said last named means comprising a passage through the bar adjacent each longitudinal edge of the bar opening, said passages terminating adjacent the point of engagement of the hooks with the shoulder.

8. A holder for a license plate having an opening therethrough, said holder comprising a supporting bar having a socket therein, a plug threaded into the socket, said plug having a bore therethrough and adapted at one end to register with the opening in the license plate, the inner end portion of the bore being enlarged to form an internal shoulder, a radial flange on the outer end of the plug, the bar about the socket being recessed to receive said flange, and a spring clip adapted for insertion through the opening in the plate and into the plug bore; said clip comprising a spring leg, a hook on the inserted end of said leg and adapted to engage said shoulder, and a head on the other end of the leg.

9. A device as in claim 8 in which the radial flange is of greater diameter than the head whereby, upon removal of that portion of the license plate adjacent the head, the flange is accessible.

HERMAN C. CHRIST.